(12) United States Patent
Johansson et al.

(10) Patent No.: US 9,826,060 B1
(45) Date of Patent: Nov. 21, 2017

(54) PREDICTIVE TRANSMISSION OF DIGITAL CONTENT

(71) Applicant: Amazon Technologies, Inc., Seattle, WA (US)

(72) Inventors: Jesper Mikael Johansson, Redmond, WA (US); Stephen Barton Rospo, Redmond, WA (US); James Cleveland Willeford, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 48 days.

(21) Appl. No.: 14/624,535

(22) Filed: Feb. 17, 2015

(51) Int. Cl.
 *H04L 9/32* (2006.01)
 *G06F 7/04* (2006.01)
 *H04L 29/08* (2006.01)
 *G06Q 30/06* (2012.01)
 *H04L 29/06* (2006.01)

(52) U.S. Cl.
 CPC ....... *H04L 67/327* (2013.01); *G06Q 30/0635* (2013.01); *H04L 63/0428* (2013.01); *H04L 67/306* (2013.01)

(58) Field of Classification Search
 CPC .. H04L 67/327; H04L 67/306; G06C 30/0635
 USPC ........................................................ 713/168
 See application file for complete search history.

(56) References Cited

U.S. PATENT DOCUMENTS

| 7,065,550 B2 * | 6/2006 | Raghunandan ... G06F 17/30867 705/14.54 |
| 7,370,342 B2 * | 5/2008 | Ismail .................... H04H 60/06 348/E5.002 |
| 7,657,594 B2 * | 2/2010 | Banga ............... G06F 17/30867 709/203 |
| 8,655,970 B1 * | 2/2014 | Cohen .................... G06Q 30/00 455/412.2 |
| 8,769,593 B1 * | 7/2014 | Schwartz ........... H04N 21/8456 725/101 |
| 8,977,776 B1 | 3/2015 | Lee et al. |

(Continued)

OTHER PUBLICATIONS

Anderson, N., "Deep Packet Inspection Meets 'Net Neutrality, CALEA," Ars Technica, Gear & Gadgets/Product News & Reviews, Jul. 25, 2007, <http://arstechnica.com/gadgets/2007/07/deep-packet-inspection-meets-net-neutrality/1/> [retrieved Feb. 18, 2015], 8 pages.

*Primary Examiner* — Dede Zecher
*Assistant Examiner* — Abdullah Almamun
(74) *Attorney, Agent, or Firm* — Davis Wright Tremaine LLP

(57) ABSTRACT

A digital content provider is configured to identify, based at least in part on various customer user profiles, digital content that is to be pre-loaded onto one or more customer computing devices in advance of the digital content being available for at least one mode of consumption by the one or more computing devices. The digital content provider may use these user profiles, as well as other external information, to identify one or more customers that are to receive the digital content. Subsequently, the digital content provider may download the digital content onto each identified customer's one or more computing devices in advance of the at least one mode of consumption becoming available to the customers. Once the mode of consumption is made available, the digital content provider may enable the use of the pre-loaded digital content.

20 Claims, 11 Drawing Sheets

(56) References Cited

U.S. PATENT DOCUMENTS

| | | | | |
|---|---|---|---|---|
| 9,129,089 | B2 * | 9/2015 | DiAcetis | G06F 21/10 |
| 2008/0154798 | A1 * | 6/2008 | Valz | G06Q 30/02 |
| | | | | 705/400 |
| 2008/0275974 | A1 * | 11/2008 | Rackiewicz | H04L 67/306 |
| | | | | 709/223 |
| 2009/0043896 | A1 * | 2/2009 | Law | H04L 65/4069 |
| | | | | 709/228 |
| 2010/0333137 | A1 * | 12/2010 | Hamano | H04H 60/46 |
| | | | | 725/39 |
| 2011/0107373 | A1 * | 5/2011 | Scott | H04N 7/17318 |
| | | | | 725/40 |
| 2012/0148217 | A1 * | 6/2012 | Ellis | H04H 60/31 |
| | | | | 386/297 |
| 2012/0210351 | A1 * | 8/2012 | Nukala | H04N 21/25883 |
| | | | | 725/35 |
| 2013/0303288 | A1 * | 11/2013 | McCoy | G07F 17/3227 |
| | | | | 463/42 |
| 2013/0332839 | A1 * | 12/2013 | Frazier | H04N 21/4532 |
| | | | | 715/738 |
| 2016/0173560 | A1 * | 6/2016 | Datta | H04L 67/02 |
| | | | | 709/203 |

* cited by examiner

PREDICTIVE TRANSMISSION OF DIGITAL CONTENT

BACKGROUND

Customers and other users often access a digital content provider to stream a variety of digital content. Upon request, the digital content provider may stream the digital content onto a customer's computing device, thereby enabling the customer to access and use the digital content through their own computing device. However, as digital content becomes available, many customers may transmit requests to the digital content provider, causing the digital content provider to provide the newly available digital content to these customers simultaneously. This may significantly increase the network load for the digital content provider. Thus, digital content providers may need to upgrade their network capabilities and bandwidth to handle such demand for new digital content, which in turn may increase the operational and infrastructure costs for the digital content providers.

BRIEF DESCRIPTION OF THE DRAWINGS

Various embodiments in accordance with the present disclosure will be described with reference to the drawings, in which.

DETAILED DESCRIPTION

Figure 1:
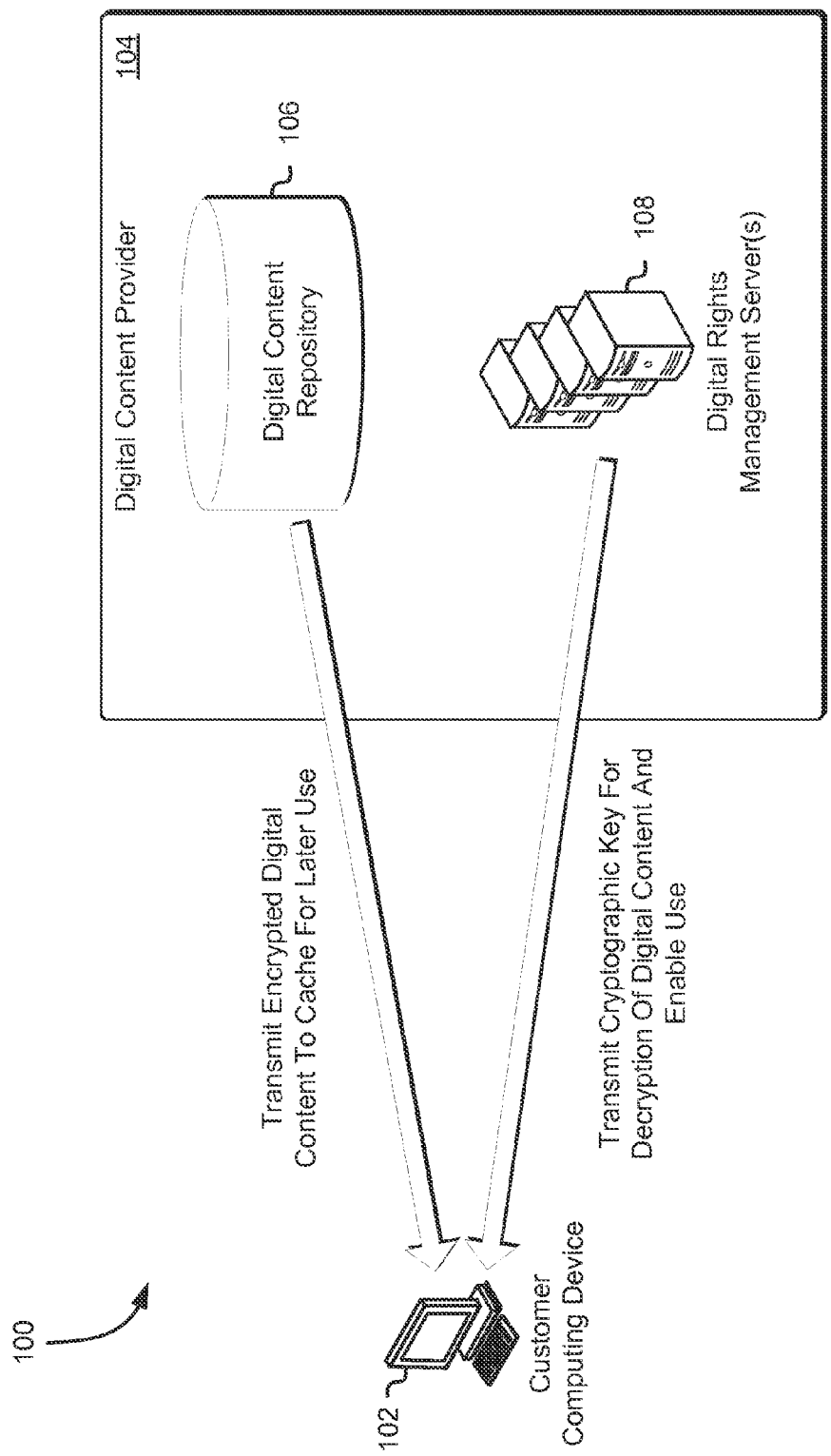
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the predictive transmission of digital content to a customer's computing device based on a customer's digital content preferences, activities and other trends. In an embodiment, a digital content provider obtains digital content from a publisher that is not to be accessible by a customer prior to a particular date. For instance, the digital content may be an unreleased episode of a popular television program or an unreleased expansion to a popular video game. The digital content may be encrypted by the publisher of the digital content or the digital content provider to prevent unauthorized access to the digital content prior to the particular date of release. Additionally, the digital content provider may maintain one or more cryptographic keys, which may be used to decrypt the digital content and enable access to the digital content.

Based on the popularity of the digital content and the preferences and trends for various customers, the digital content provider may select a plurality of target customers for the digital content. The digital content provider may, for instance, select the plurality of target customers as ones whose past activities indicates a likelihood of requesting the digital content. For instance, the plurality of target customers may comprise customers who have viewed a set of previous episodes of a series, such as all previous episodes or an immediately preceding episode.

The digital content service may then schedule, for each target customer, a download of the digital content onto his/her computing device. The digital content service may, for instance, schedule downloads for time periods of low aggregate usage of the digital content service. As another example, the digital content service may evaluate a customer's travel itinerary or other schedule to determine when the customer will be available to download the particular digital content prior to an event (e.g., flights, vacation, etc.). Based on each target customer's schedule, the digital content service may transmit the encrypted digital content to each target customer's computing device. However, the target customers may not, at this time, receive the cryptographic key necessary to decrypt the digital content. This may prevent a target customer from utilizing his/her computing device to access the digital content prematurely.

In an embodiment, when a customer uses his/her computing device to access the digital content stored on the computing device, the computing device determines whether the digital content may be accessed by the customer. For instance, the computing device may refer to an index file or other database that may specify an availability date for digital content stored on the computing device. If the digital content is available for use, the computing device may transmit a request to the digital content service for the cryptographic key necessary to decrypt the digital content. Once the customer's computing device has received the cryptographic key from the digital content service, the computing device may utilize the cryptographic key to decrypt the stored digital content and enable the customer to access the digital content for his/her own needs.

In this manner, the digital content provider can distribute digital content to a plurality of customers over a period of time before the digital content is accessible by the plurality of customers in a manner that prevents or reduces simultaneous streaming of the digital content once accessible. In addition, the techniques described herein facilitate additional technical advantages. For example, because, in some embodiments, the digital content service analyzes each target customer's schedule to determine when the customer's computing device is available, the digital content service may distribute the digital content to its customers based on these schedules and in a manner that minimizes the network bandwidth load for streaming of the digital content once it is accessible by these customers. Further, this may enable customers to access the digital content while in a remote location with limited network resources, as these customers may only be required to download a small cryptographic key for decrypting the digital content once it becomes available for use.

FIG. 1 shows an illustrative example of an environment 100 in which various embodiments can be implemented. In the environment 100, a digital content provider 104 may provide digital content to one or more customers through a customer computing device 102. For instance, the digital content provider 104 may be a video streaming service, which may enable customer to stream their favorite television programs and cinematic releases to their customer computing devices 102, enabling the customers to enjoy these programs and releases from the comfort of their own homes. Additionally, or alternatively, the digital content provider 104 may be an online gaming service, which may provide downloadable content for existing games that may be installed on a customer's 102 computing device.

The digital content provider 104 may include a digital content repository 106, which the digital content provider 104 may utilize to store digital content that may be streamed or transmitted to the customer computing device 102 upon request. For instance, the digital content provider 104 may maintain a business relationship with one or more publishers of digital content to provide this digital content to the digital content provider's 104 customers. As the one or more publishers produce digital content for public consumption, the one or more publishers may provide this digital content to the digital content provider 104, which may store this digital content within the digital content repository 106. In some cases, the one or more publishers may enforce certain restrictions on when the digital content may be accessed by the customers of the digital content provider 104. For instance, for new releases of a particular television series or of a cinematic feature, the one or more publishers may want to have this digital content unavailable for at least one mode of consumption until a particular date. This may prevent licensing issues with other retailers, who may be selling the digital content through a physical media on an agreed-to date. Alternatively, the one or more publishers may provide the digital content service 104 with digital content that may be accessible by its customers immediately, such as older syndicated programs, less popular films or classic video games and other content.

In an embodiment, the digital content provider 104 evaluates one or more customer profiles to determine what digital content may be provided to the customer in anticipation of a customer request to access the digital content. For instance, the digital content provider 104 may evaluate, through a customer profile, the customer's recent activities, including recently accessed digital content, inquiries to the availability of particular digital content, and the like. The digital content provider 104 may further estimate the popularity of the digital content to determine whether the digital content may be requested by a vast number of customers through their customer computing devices 102. If the digital content provider 104 determines, based at least in part on a customer profile and other external factors, that the digital content is to be downloaded on to the customer computing device 102, the digital content provider 104 may evaluate the customer's schedule, made available through the customer profile or in response to a request to the customer computing device 102 for the schedule, to determine at which time the digital content may be downloaded on to the customer computing device 102.

For instance, the digital content service 104 may evaluate an upcoming travel itinerary for a particular customer to determine when his/her computing device 102 will be available for downloading digital content onto the computing device 102. Subsequently, the digital content service 104 may determine what digital content is to be pre-loaded onto the customer's computing device 102 for later use. Based at least in part on the customer's upcoming travel itinerary and availability of the customer's computing device 102, the digital content service may schedule download of the selected digital content onto the customer's computing device 102 for later use. This may enable the customer to access the digital content while offline or within a region with limited network connectivity. The digital content downloaded onto the customer's computing device may be unavailable for at least one mode of consumption until a defined date. For instance, the digital content may be unavailable to the customer until he/she purchases the digital content through the digital content application, at which time the digital content application may enable access to the digital content. In another instance, the digital content may be available for pre-order, enabling the customer to purchase the digital content with the digital content being unavailable for use until the actual release date.

In an alternative embodiment, the digital content service 104 utilizes the customer profile to identify one or more unfinished digital content series that the customer has accessed through the customer computing device 102. For instance, the customer may utilize his/her computing device 102 to access one or more episodes of a television series. Alternatively, the customer may purchase a season pass to downloadable content that may be available to the customer upon release from the publisher. The digital content service 104 may identify the digital content segments (e.g., episodes, etc.) from the digital content series that have been released and have not been access by the customer and the segments that have not been released but are stored within the digital content repository 106 for later access by the customers of the digital content provider 104. The digital content service 104 may select some or all of the digital content segments not previously accessed by the customer and schedule a download of these segments onto the customer's computing device 102 during a time when the computing device 102 is available for downloading the segments.

The digital content provided to the customer computing device 102 by the digital content provider 104 may be encrypted in order to prevent unauthorized access to the digital content by the customer or other user of the customer computing device 102. For instance, the digital content may be encrypted utilizing one or more Digital Rights Management (DRM) techniques to prevent unauthorized access and tampering of the digital content. In an embodiment, the digital content is transmitted to the customer computing device 102 with an associated index file or metadata specifying the date when the digital content may be available for use by the customer through the customer computing device 102. Prior to this date, the customer computing device 102 may not enable the customer to access the digital content, as the customer computing device 102 may not have the necessary cryptographic key or other license necessary to decrypt the downloaded digital content for use. It should be noted, however, that in some embodiments, the digital content may not be encrypted and may be made available for use immediately upon download to the customer computing device 102. For instance, if the digital content comprises older or otherwise previously released materials (e.g., older episodes of a television series, a classic game, etc.), the digital content provider 104 may provide this digital content in an unencrypted format to enable immediate access by the customer.

If the digital content downloaded onto the customer computing device 102 is encrypted, the customer computing device 102 may determine whether the digital content may be accessible by the customer or other user of the customer computing device 102. For instance, as noted above, the digital content may be downloaded onto the customer computing device 102 with an associated index file or metadata specifying the date when the digital content may be used by the customer. The customer computing device 102 may evaluate this index file or metadata to determine whether the customer may utilize this digital content. If the customer computing device 102 determines that the digital content is available for use by the customer, the customer computing device 102 may transmit a request to one or more DRM servers 108 to obtain one or more cryptographic keys and a license to decrypt the digital content stored on the customer computing device 102 and enable the customer to access the digital content. In an alternative embodiment, the DRM servers 108 are configured to transmit the one or more cryptographic keys to the customer computing device 102 automatically on or after the date the digital content is available for customer access. In yet another embodiment, the customer computing device 102, through an application interface installed on the device 102, enables the customer to select the digital content to be accessed through the interface. The customer computing device 102 may only allow the customer to select the digital content through the interface if the availability date has passed. Once the customer has selected the digital content to be accessed, the customer computing device 102 may transmit the request to the DRM servers 108 to obtain the one or more cryptographic keys necessary to decrypt the requested digital content.

Figure 2:
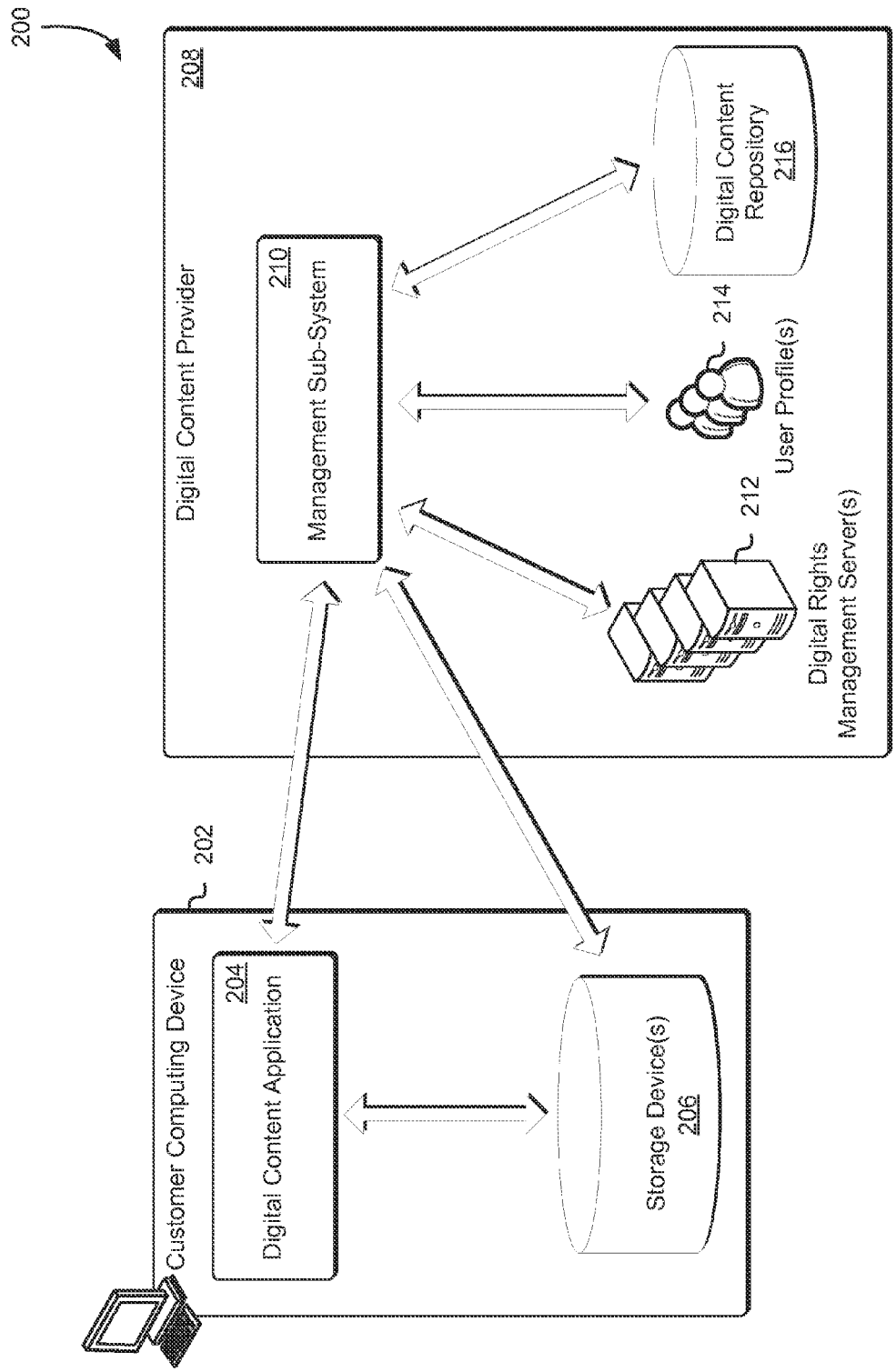
FIG. 2 shows an illustrative example of an environment in which a customer computing device receives newly available digital content from a digital content provider based at least in part on the customer's content preferences and trends in accordance with at least one embodiment.

As noted above, a digital content provider may transmit digital content to a customer computing device based at least in part on a customer's preferences, activities and popularity of the digital content. This digital content may be encrypted to prevent unauthorized access of the digital content prior to the availability date for the digital content or any other tampering with the digital content. Accordingly, FIG. 2 shows an illustrative example of an environment 200 in which a customer computing device 202 receives newly available digital content from a digital content provider 208 based at least in part on the customer's content preferences and trends in accordance with at least one embodiment. In the environment 200, the digital content provider 208 may include a management sub-system 210, which may be configured to analyze one or more user profiles 214 to determine what digital content is to be downloaded onto one or more storage devices 206 of the customer's computing device 202. A user profile 214 may specify what digital content a customer has accessed in the past, any prior searches made by the customer through a digital content application 204 installed on the customer computing device 202, a customer wish list provided through the digital content application 204 and the like.

Additionally, the user profile 214 may include a schedule of the customer's current and future availability (e.g., future travel plans, meetings, vacations, etc.) that may enable the management sub-system 210 to determine when the digital content from the digital content repository 216 is to be downloaded onto the one or more storage devices 206 of the customer computing device 202. For instance, if the digital content is published to the digital content repository 216 a week before the digital content is available for use and the management sub-system 210 determines, based at least in part on a customer's user profile 214, that the customer will be unavailable five days prior to the digital content being made available for use, the management sub-system 210 may download the digital content from the digital content repository 216 to the one or more storage devices 206 within the two available days that coincide with the digital content being stored within the digital content repository 216 and the customer's availability. In an embodiment, the management sub-system 210 evaluates the various user profiles 208 to identify the availability of each customer that has been targeted for receiving of a particular set of digital content. Based at least in part on this availability, the management sub-system 210 may determine an optimal schedule for transmitting the digital content to the storage devices 206 of each target customer's computing device 202. In some embodiments, the management sub-system 210 may transmit one or more requests to the digital content application 204 installed on the customer computing device 202 to request a copy of the customer's schedule and other preferences that may be stored within the customer's user profile 214 for analysis and scheduling of a download of the digital content onto the one or more storage devices 206.

In some embodiments, the management sub-system 210, may evaluate one or more digital content usage logs within the customer's user profile 214 to identify the capabilities of the customer computing device 202. For instance, through these usage logs, the management sub-system 210 may determine the network bandwidth of the customer computing device 202 over time. This information, in conjunction with the schedule of the customer's current and future availability, may enable the management sub-system 210 to determine when digital content, or at least a portion of the digital content, is to be downloaded onto the one or more storage devices 206 of the customer computing device 202. For example, if the customer computing device 202 has low bandwidth available for downloading or streaming digital content, the management sub-system 210 may download at least a portion of the digital content onto the one or more storage devices 206 over a longer period of time, as more time may be required to download the digital content.

The customer's user profile 214 may have time-segmented information that may be used to determine what digital content is to be provided to the customer. For instance, the customer's user profile 214 may include usage history of digital content consumed by the customer over a period of time. For example, the customer's usage history may indicate that the customer watches particular digital content of a series between 9 P.M. and midnight on Sunday evenings. Further, the customer's usage history may further specify that the customer's network bandwidth available to the customer computing device is low during that particular time window (e.g., due to regional Internet usage, etc.). This may cause the management sub-system 210 to pre-load a greater amount of digital content associated with the series over a longer period of time, as the low network bandwidth for the customer computing device 202 may preclude streaming a significant amount of data during the time period in which the customer may access the digital content. Additionally, or alternatively, analysis of this time-segmented information by the management sub-system 210 may cause the digital content to be pre-loaded onto the one or more storage devices 206 when it otherwise would not be. For instance, the management sub-system 210 may more aggressively pre-load portions of the digital content if the overall network bandwidth is low for the subset of the plurality of customers.

In another example, the management sub-system 210 may use the time-segmented information in the user profile 214 for a plurality of customers to select a subset of customers that may receive at least a portion of the digital content that is to be pre-loaded to each customer's one or more storage devices 206. For instance, if the management sub-system 210 determines, based on this time-segmented information for a plurality of customers, that a subset of a plurality of customers watches episodes of a particular series at a given time, the management sub-system 210 may utilize this information to select the digital content and the appropriate time for downloading this digital content onto the one or more storages devices 206 of the subset of the plurality of customers.

In some instances, the management sub-system 210 may determine whether to download the entirety of the digital content or a portion of the digital content onto the one or more storage devices 206 of the customer computing device 202. For instance, if the customer computing device 202 has high network bandwidth available for streaming digital content and the customer's user profile 214 specifies that the device 202 will be available immediately upon release of the digital content, the management sub-system 210 may download a smaller portion of the digital content onto the one or more storage devices 206, as the customer computing device 202 may be able to stream the remaining portion of the digital content easily upon release. Alternatively, if the management sub-system 210 determines that the customer computing device 202 has low network bandwidth available and/or the customer computing device 202 will be unavailable for a period of time from the date of release of the digital content, the management sub-system 210 may download onto the one or more storage devices 206 a greater portion of the digital content or, in some cases, the entire digital content to enable offline access.

The management sub-system 210, in some embodiments, may download a sample of the digital content onto the one or more storage devices 206 of the customer computing device 202. This sample of the digital content may be freely available to the customer, without need for a cryptographic key or other license to access the sample. The customer may utilize the digital content application 204 to consume the sample and determine whether he/she is interested in the digital content. Further, the digital content application 204 may record the length of time the customer has spent consuming the sample of the digital content. For instance, if the customer spends less than predetermined amount of time consuming the sample, the management sub-system 210 may determine that the customer is not interested in the digital content. However, if the customer consumes the sample of the digital content in its entirety and/or multiple times, the management sub-system 210 may determine that the customer is interested in the digital content and provide a greater portion, perhaps all, of the digital content to the customer computing device 202.

The management sub-system 210, in addition to the digital content, may transmit an index file or other metadata to the customer's one or more storage devices 206. This index file or other metadata may specify a date when the digital content stored within the storage device 206 may be used by the customer through the digital content application 204. For instance, if particular digital content can only be accessed by the customer after a certain date, the digital content application 204 may prevent the customer from accessing the digital content until on or after the date. The digital content may be encrypted by the digital content provider 208 or by the publisher of the digital content, which may provide the encrypted digital content to the digital content provider 208. The digital content provider 208 may then store the digital content within the digital content repository 216 for later use. Further, the digital content provider 208 may include one or more DRM servers, which may include the one or more cryptographic keys necessary to decrypt the digital content for use with the digital content application 204 of the customer computing device 202. Thus, the digital content downloaded onto the one or more storage devices 206 may be encrypted, preventing the customer to access of otherwise tamper the received digital content.

The digital content application 204 may be configured to evaluate the index files for the digital content stored within the one or more storage devices 206 to determine if any digital content may be accessed by the customer for use. For instance, if the digital content application 204 determines, based at least in part on the index file or metadata that particular digital content has become available for use, the digital content application 204 may transmit a request to the management sub-system 210 of the digital content provider 208, such as through one or more application programming interface (API) calls to the sub-system 210, to obtain the one or more cryptographic keys necessary to decrypt the digital content. Subsequently, the management sub-system 210 may access the one or more DRM servers 212 to obtain the requested one or more cryptographic keys and provide these cryptographic keys to the digital content application 204. In an alternative embodiment, the DRM servers 212 may transmit the cryptographic keys directly to the digital content application 204 rather than utilizing the management sub-system 210 for delivery of the cryptographic keys. The digital content application 204 may utilize the one or more cryptographic keys to decrypt the digital content stored within the one or more storage devices 206 and enable the customer to utilize the digital content through the digital content application 204. It should be noted that the digital content may not be encrypted, thus obviating the need for the one or more cryptographic keys. For instance, if the digital content downloaded onto the one or more storage devices 206 includes older or less popular subject matter (e.g., television series reruns, older games, etc.), the digital content provider 208 may enable the customer to access this digital content at any time from the one or more storage devices 206.

In an embodiment, the digital content application 204 includes an interface through which a customer may specify which digital content he/she would like to access at a given time. The digital content application 204 may enable the customer to select, through the interface, digital content that may be stored within the storage device 206 and that is available for use. If the digital content is available for use, the digital content application 204 may transmit a request, upon customer selection of the digital content, to the management sub-system 210 to obtain the cryptographic keys from the DRM servers 212 necessary to decrypt the selected digital content. Upon receipt of the cryptographic keys, the digital content application 204 may utilize the cryptographic keys to decrypt the selected digital content and enable the customer to use the digital content. If the digital content is not available for use but is stored within the one or more storage devices 206, the digital content application 204 may omit the digital content from the database, thereby preventing the customer from accessing the digital content until it is made available for use based at least in part on the index file or metadata provided by the digital content provider 208 or publisher of the digital content.

Figure 3:
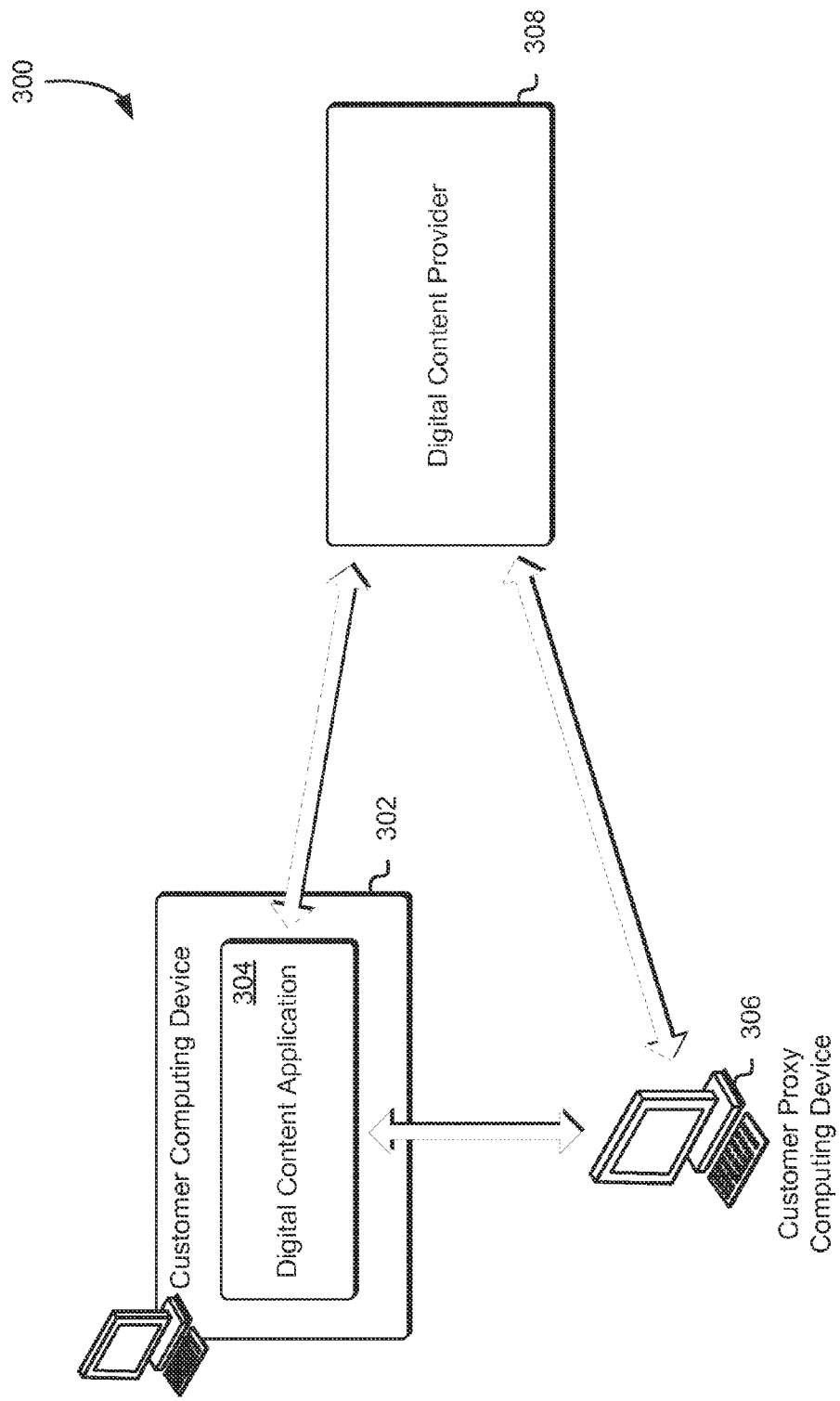
FIG. 3 shows an illustrative example of an environment in which a customer computing device receives newly available digital content from a proxy computing device configured to store the digital content on behalf of the customer in accordance with at least one embodiment.

As noted above, a digital content provider may download encrypted digital content onto one or more storage devices accessible by a digital content application based at least in part on a customer's user profile (e.g., digital content preferences, previous digital content usage, etc.) and the popularity of the digital content. This digital content may be downloaded onto the one or more storage devices at any time prior to the digital content being available for use by the customer. In an embodiment, the digital content provider determines that the customer's computing device does not have the requisite storage capacity for storing the digital content to be downloaded and instead selects an alternate, proxy computing device that may be used to store the digital content. Accordingly, FIG. 3 shows an illustrative example of an environment 300 in which a customer computing device 302 receives newly available digital content from a proxy computing device 306 configured to store the digital content on behalf of the customer in accordance with at least one embodiment.

In the environment 300, the digital content provider 308 may determine, based at least in part on information stored within the customer's user profile, that his/her customer computing device 302 may not have sufficient capacity for storing particular digital content. For instance, in an embodiment, the digital content application 304 installed on the customer computing device 302 is configured to periodically transmit information regarding the customer computing device 302 to the digital content provider 308. This information may include the available remaining storage capacity for the customer computing device 302. The digital content provider 308 may store within the customer's user profile until it is needed to determine whether the customer computing device 302 has sufficient capacity for storing digital content that is to be distributed to the customer for later use. In an alternative embodiment, the digital content provider 308, upon determining that it is to download particular digital content onto the customer computing device 302, transmits a request to the digital content application 304 to determine the available storage capacity within the customer computing device 302.

In an embodiment, the customer, through the digital content application, specifies the available storage capacity within the customer computing device 302 that is reserved for the storage of digital content. For example, the customer may specify that the digital content provider 308 may download, onto the customer computing device 302, digital content that matches certain customer criteria until the available storage capacity has been consumed. Alternatively, a customer may allocate a portion of the available storage capacity to particular digital content. For instance, a customer may reserve a portion of available storage capacity to a particular television series, causing the digital content provider to provide episodes of this particular television series that would fill the reserved portion of the available storage capacity. Once the digital content has been consumed, the customer may remove this digital content from his/her customer computing device 302 and enable the digital content provider 308 to fill the available capacity with new digital content.

If the customer computing device 302 does not have sufficient storage capacity for storing the digital content that is to be downloaded, the digital content provider 308 may attempt to identify one or more customer proxy computing devices 306 that may be used for storing the digital content. For instance, the digital content application 304 may be configured, by the customer, to synchronize data between the customer computing device 302 and his/her one or more customer proxy computing devices 306. In such instances, the digital content application 304 may transmit information (e.g., Internet Protocol addresses, available storage capacity, etc.) of these customer proxy computing devices 306 to the digital content provider 308, which may then select one or more customer proxy computing devices 306 and download the digital content to these devices 306. The digital content provider 308 may subsequently transmit a notification to the digital content application 304 to indicate where the digital content is stored. The digital content application 304 may maintain a database within the customer computing device 302 specifying the date when the downloaded digital content is available for use.

Once the encrypted digital content stored within the one or more customer proxy computing devices 306 become available for use, the digital content application 302 may access the digital content database to identify the digital content that is now available for use. The digital content application 304 may subsequently transmit a request to the digital content provider 308 to obtain one or more cryptographic keys that may be used to decrypt the digital content stored within the one or more customer proxy computing devices 306. The digital content application 304 may now enable the customer to access this digital content through the application 304. For instance, when the customer selects the digital content from an interface provided by the digital content application 304, the digital content application 304 may establish a communications channel between the customer computing device 302 and the one or more customer proxy computing devices 306 to enable streaming of the newly decrypted digital content. This may obviate the need to stream the digital content from the digital content provider 308.

Figure 4:
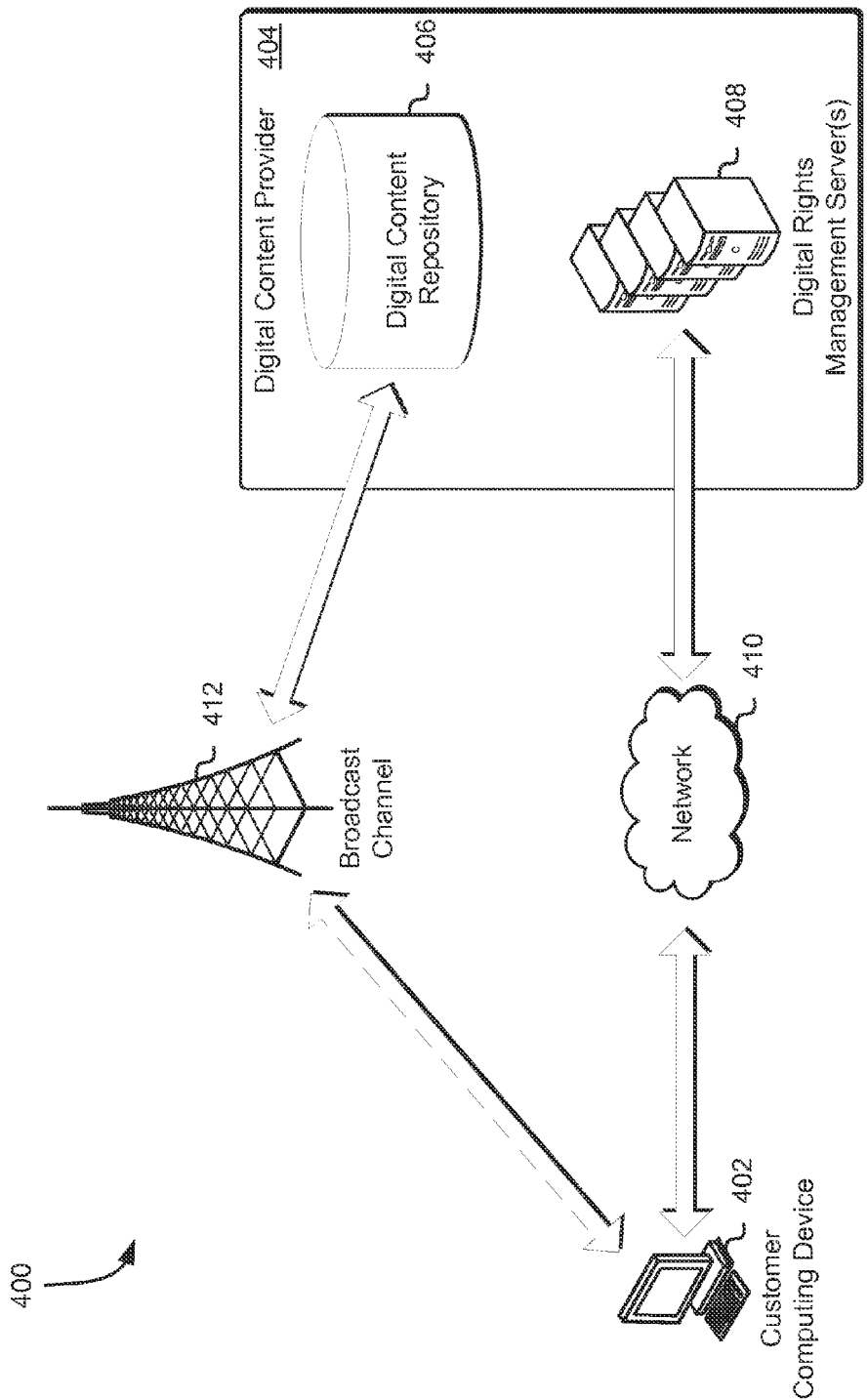
FIG. 4 shows an illustrative example of an environment in which a digital content provider broadcasts digital content to its customers to enable customer computing devices to download digital content as needed in accordance with at least one embodiment.

In some embodiments, the digital content provider may broadcast encrypted digital content over one or more broadcast channels. The customer computing device, through a digital content application, may determine whether the encrypted digital content should be downloaded onto the customer computing device for later use by the customer. This decision may be based at least in part on the customer's user profile and other information (e.g., digital content popularity, etc.). Accordingly, FIG. 4 shows an illustrative example of an environment 400 in which a digital content provider 404 broadcasts digital content to its customers to enable customer computing devices 402 to download digital content as needed in accordance with at least one embodiment. In the environment 400, a digital content provider 404 may maintain a variety of digital content within a digital content repository 406. The digital content provider 404 may receive this digital content from one or more publishers, which may specify a date for the availability of this digital content to the customers of the digital content provider 404.

The digital content provider 404 may analyze various customer data stored within customer user profiles, as well other external information (e.g., box office receipts, wish list entries, popular search queries satisfied by the digital content, etc.) to determine what digital content may be popular with a variety of customers of the digital content provider. Based at least in part on this determination, the digital content provider 404 may select potentially popular digital content from the digital content repository 406 and broadcast this digital content over one or more broadcast channels 412. A customer computing device 402 subscribed to the one or more broadcast channels 412 may obtain the digital content over the one or more broadcast channels 412 and store the digital content within one or more storage devices for later use. In an alternative embodiment, the digital content provider 404 utilizes multicast to provide the digital content to one or more customer computing devices 402 that may be subscribed to the multicast. This may enable the digital content provider 404 to provide one copy of the digital content over the multicast, allowing the nodes in the multicast network to replicate the digital content to reach the subscribed customer computing devices 402. The digital content provider 404 may utilize other methods to transmit the digital content to a customer computing device 402, such as anycast, unicast and geocast routing schemes.

Once the customer computing device 402 has received the encrypted digital content through the one or more broadcast channels 412, the digital content application installed on the customer computing device 402 may determine whether the digital content is available for use (e.g., decrypted for use by the customer through the application). For instance, the digital content application may access the index file or metadata of the digital content to determine an availability date for the digital content. If, based at least in part on this availability date, the digital content application determines that the customer may access the digital content; the digital content application may establish a communications channel with one or more DRM servers 408 of the digital content provider 404 over one or more communications networks 410, such as the Internet. The digital content application may transmit, over this communications channel, a request to the DRM servers 408 to request one or more cryptographic keys that may be used to decrypt the digital content stored on the customer computing device 402 and enable customer use of the digital content.

In an alternative embodiment, once the digital content has become available for use by customers of the digital content provider, the DRM servers 408 may transmit the one or more cryptographic keys necessary to decrypt the digital content over the one or more broadcast channels 412. This may enable the customer computing device 402 to receive the cryptographic keys over the one or more broadcast channels and store these one or more cryptographic keys until the customer is ready to use the digital content. Subsequently, the customer computing device 402 may use the cryptographic keys to decrypt the digital content and enable the customer to access the digital content through the digital content application.

Figure 5:
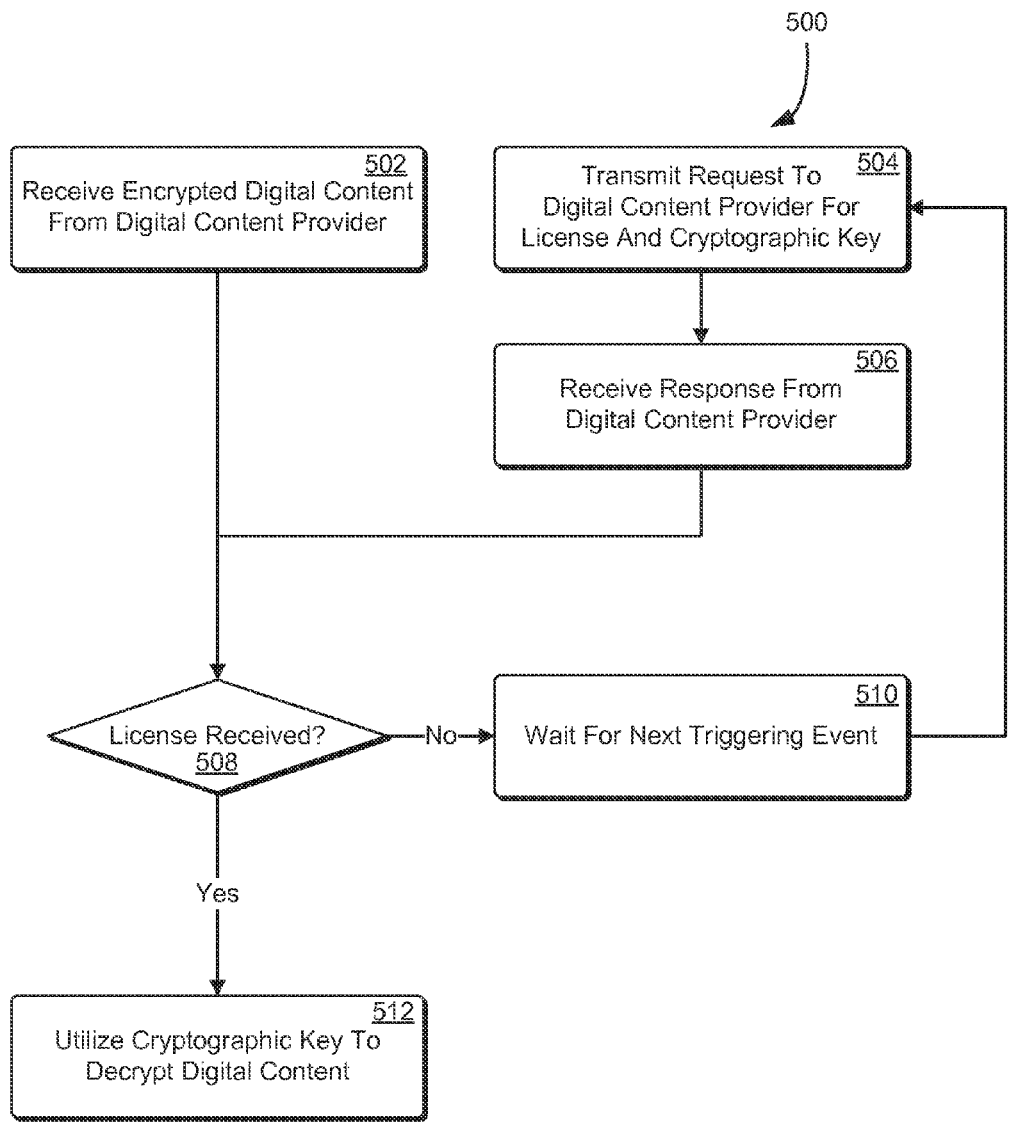
FIG. 5 shows an illustrative example of a process for receiving and decrypting digital content upon the digital content being available for use by a customer in accordance with at least one embodiment.

As noted above, a digital content provider may transmit encrypted digital content to a customer computing device prior to the digital content being accessible by the customer for use. For instance, the digital content provider, based at least in part on customers' digital content preferences, trends and other external factors (e.g., popularity of search queries related to particular digital content, box office revenues, etc.), may identify a set of target customers that may be provided with the encrypted digital content prior to it being accessible to these target customers. Accordingly, FIG. 5 shows an illustrative example of a process 500 for receiving and decrypting digital content upon the digital content being available for use by a customer in accordance with at least one embodiment. The process 500 may be performed by a customer computing device, which may include one or more storage devices for storing the encrypted digital content and one or more digital content applications configured to communicate with the digital content provider and enable the customer to utilize the digital content once made accessible by the digital service application and the digital content provider.

Upon publishing of digital content to the digital content provider by a publisher of digital content, the digital content provider may access one or more user profiles and other external information as described above to identify a set of target customers that may receive the published digital content. This digital content may be encrypted by the publisher or the digital content provider in order to prevent unauthorized access to the encrypted digital content before it is made available for use per the publisher's or the digital content provider's instruction. Thus, each encrypted digital content may include an associated index file or other metadata that may specify the date in which the digital content may be made accessible to the customer through the customer's digital content application installed on his/her computing device. Once the digital content provider has identified the target customers for the digital content, the digital content provider may transmit the encrypted digital content to each customer computing device of the target customers. Thus, the customer computing device may, at any time, receive 502 encrypted digital content from a digital content provider. The customer computing device may subsequently store the received digital content within one or more storage devices. Additionally, in some embodiments, the customer computing device may update a database specifying the availability date for digital content stored within the one or more storage devices with the date when the received digital content may be available for use by the customer.

The customer computing device may also transmit 504 a request to the digital content provider for the license and cryptographic key necessary to decrypt the digital content from the digital content provider. In some embodiments, the request for the license and cryptographic key may be transmitted to the digital content provider upon receiving the encrypted digital content from the digital content provider. For instance, based at least in part on the digital content received, the customer computing device may utilize the index file or other metadata that may be included with the encrypted digital content to generate the request, which may specify and identifier for the digital content. This may enable the digital content provider to identify the corresponding license and cryptographic key for the encrypted digital content. In alternative embodiments, the request for the license and cryptographic key may be transmitted to the digital content provider prior to receiving the encrypted digital content. For instance, if a customer, through his/her computing device, selects particular digital content for preorder, the customer's computing device may transmit a request to the digital content provider to obtain the license and cryptographic key necessary to decrypt the digital content when, at a later time, it is transmitted to the customer's computing device. In some embodiments, the license and corresponding cryptographic keys may not be utilized until the digital content has been made available for consumption.

The digital content provider, upon receiving the request from the customer computing device for the license and cryptographic key, may determine whether to provide the license and cryptographic key to the customer. For instance, if the encrypted digital content is now available for use, the digital content provider may provide the request to one or more DRM servers, which may determine the appropriate license and one or more cryptographic keys that are needed to decrypt the digital content. The DRM servers may further determine whether the request from the digital content application is valid. For instance, the DRM servers may determine whether the restriction date for the digital content has passed and, if the request from the application arrives before the restriction date, the DRM servers may deny the request, as the digital content may not be available for use. The DRM servers, through the digital content provider, thus may provide a response to the request from the customer computing device for the license and corresponding one or more cryptographic keys. Thus, the customer computing device may receive 506 a response from the digital content provider. It should be noted that in some embodiments, the digital content provider may automatically transmit the license and corresponding cryptographic keys to the customer computing device without requiring a request from the digital content application. In such instances, the customer computing device may not be required to transmit 504 the request to obtain the license and cryptographic keys to the digital content provider.

Once the customer computing device receives the encrypted digital content from the digital content provider and has received a response from the digital content provider, the customer computing device may determine 508 whether it has received the license and corresponding cryptographic keys for decrypting the digital content. If the customer computing device has not received the license and corresponding cryptographic keys, the customer computing device may wait 510 for the next triggering event before transmitting 504 another request to the digital content provider for the license and corresponding one or more cryptographic keys. For example, the customer computing device may wait for the customer, through a digital content application installed on the device, selects the digital content to be accessed on the device. In another example, the triggering event may occur when the customer activates his/her customer computing device from a standby mode (e.g., screensaver, sleep mode, etc.) causing the customer computing device to reinitiate one or more storage devices and applications that may have been idle in the standby mode. Another triggering event may include receipt, by the customer computing device, of a certain percentage portion of the encrypted digital content from the digital content provider.

If the customer computing device has received the license and corresponding one or more cryptographic keys from the DRM servers managed by the digital content provider, the customer computing device may utilize 512 the one or more cryptographic keys from the license to decrypt the digital content. Once the digital content has been decrypted, the customer, through the digital content application installed on his/her customer computing device, may access the digital content for his/her needs. Additionally, if only a portion of the digital content was obtained from the digital content provider, decrypting the portion of digital content may cause the computing device to transmit a request to the digital content provider to stream the remaining portions of the digital content as needed.

Figure 6:
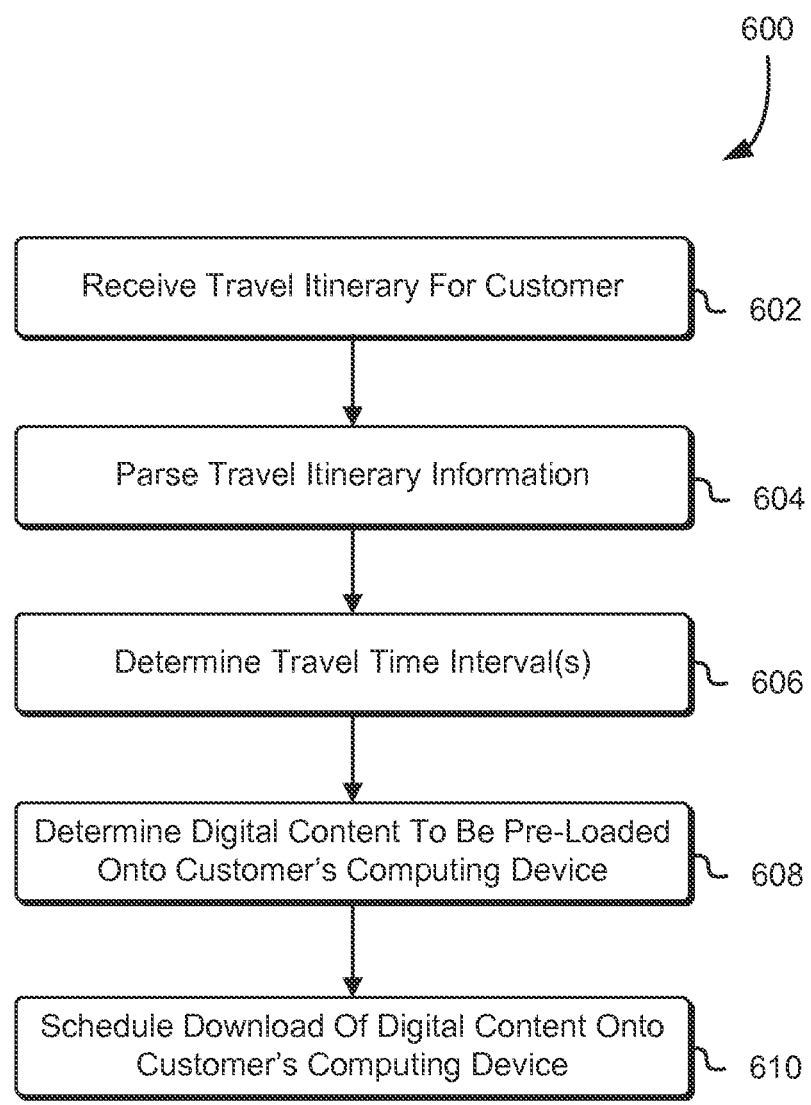
FIG. 6 shows an illustrative example of a process for scheduling download of digital content onto a customer's computing device based at least in part on a customer's travel itinerary in accordance with at least one embodiment.

As noted above, a digital content provider may access a customer's user profile to determine when the customer's computing device may be available for receiving encrypted digital content that has been selected for the customer based at least in part on his/her preferences, digital content usage trends, popularity of the digital content and the like. For instance, the digital content provider may access a customer's schedule to identify times when the customer is not travelling or busy in one or more meetings. In some embodiments, the digital content provider may transmit a request to the digital content application installed on the customer's computing device to obtain this schedule, which may subsequently be stored within the customer's user profile. Based at least on this schedule, the digital content provider may identify one or more times when digital content may be downloaded onto the customer's computing device. Accordingly, FIG. 6 shows an illustrative example of a process 600 for scheduling download of digital content onto a customer's computing device based at least in part on a customer's travel itinerary in accordance with at least one embodiment. The process 600 may be performed by the aforementioned digital content provider, which may be configured to analyze a customer's schedule and transmit digital content to the customer's computing device as needed.

Figure 7:
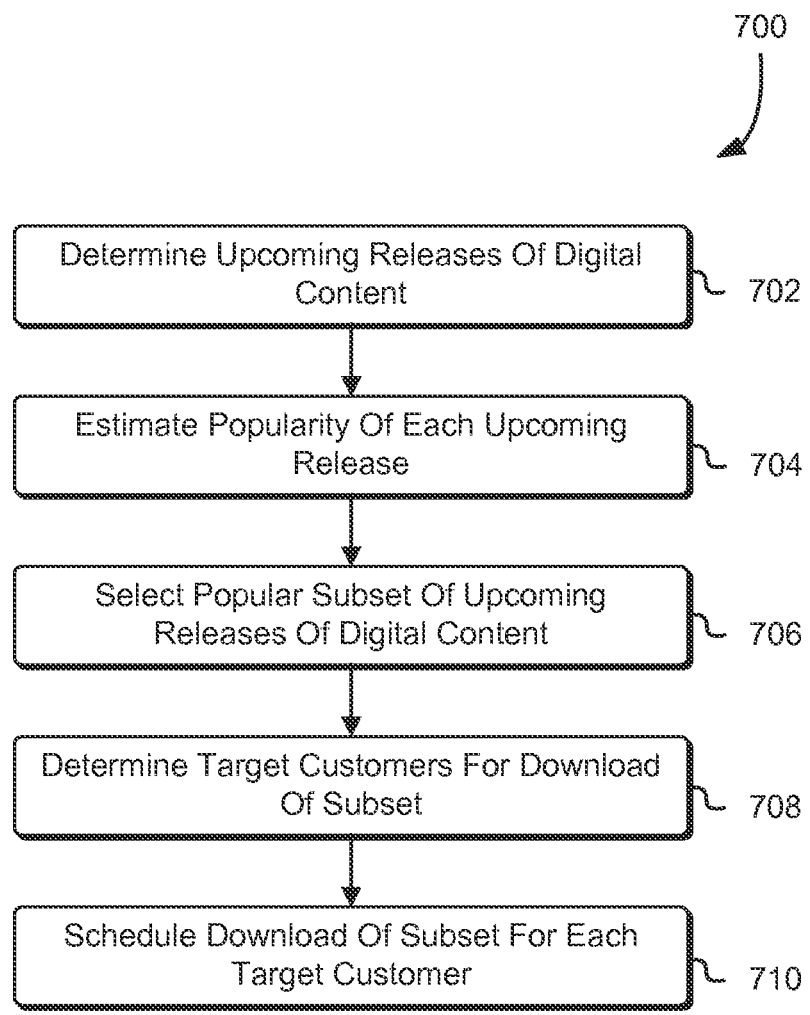
FIG. 7 shows an illustrative example of a process for scheduling download of digital content for a plurality of customers based at least in part on an estimation of the popularity of the digital content in accordance with at least one embodiment.

As will be described in greater detail below in connection with FIG. 7, the digital content provider may identify a set of target customers that may receive a particular set of digital content. This set of target customers may be selected based at least in part on each customer's digital content preferences, digital content usage trends (e.g., content stems from similar genre, customer has watched all episodes of a particular series, repeated search queries for the digital content, etc.), and other external information (e.g., box office revenues, popularity among a particular demographic, Nielsen ratings, etc.). The digital content provider, for a target customer, may determine that the customer's user profile includes a travel itinerary. Alternatively, the digital content provider may transmit a request to the customer's digital content application to obtain any customer travel itineraries that may be used to determine the availability of the customer's computing device. Thus, the digital content provider may receive 602 one or more travel itineraries for the customer.

Once the digital content provider has obtained the customer's travel itinerary, either from the digital content application installed on the customer's computing device or from the customer's user profile, the digital content provider may parse 604 through the travel itinerary information and determine 606 the customer's one or more travel time intervals for his/her travels. For instance, the digital content provider may identify, from the itinerary, departure and arrival times, as well as destination cities/locations to determine where the customer will be located during his/her travels. The travel itinerary may also specify other important information that may be used by the digital content provider. For instance, while the customer may be aboard a particular aircraft for a period of time, the aircraft may provide network connectivity. Further, the digital content provider, through the user profile or the itinerary itself, may determine that the customer may commonly take advantage of this network connectivity. Additionally, based at least in part on the customer's one or more destinations, the digital content provider may determine whether these destinations provide adequate network connectivity for the customer's computing device.

Based at least in part on the analysis of the customer's travel itinerary, the digital content provider may determine 608 what digital content is to be pre-loaded onto the customer's computing device. For instance, the digital content provider may again access the customer's user profile to determine the customer's digital content usage, preferences and trends. Utilizing this information, the digital service provider may identify any number of digital content segments that may be downloaded onto the customer's computing device prior to his/her travels. For example, if the digital content provider determines that the customer prefers to watch a number of episodes of a particular television show while travelling, the digital content provider may select one or more episodes of the show that the customer has not yet viewed.

In some embodiments, the digital content provider may predict what digital content the customer may be interested in consuming based at least in part on the customer's interactions with other applications installed on the customer computing device or other media. For instance, the digital content application installed on the customer computing device may access other applications or usage logs associated with these applications to garner information that may be used to determine the customer's digital content usage, preferences and trends. For example, if a customer uses an alternative application to listen to a particular musical artist, the digital content application may determine that the customer is interested in this musical artist and his/her compositions. The digital content application may provide this information to the digital content provider, which may use this information to identify other compositions by this musical artist or other musical artists that the customer may be interested in. In an alternative example, if a customer utilizes the digital content application to watch videos of other people interacting with a particular digital game, the digital content provider may use this information to pre-load a trial version of the digital game onto the customer computing device for the customer's use.

Once the digital content service has identified the digital content that is to be pre-loaded onto the customer's computing device, the digital content service may schedule 610 download of the selected digital content onto the customer's computing device. The digital content service may schedule download of the digital content prior to the customer's departure from any location based at least in part on the customer's travel itinerary. For instance, if the travel time from the customer's departure city to the destination city is the equivalent of watching three episodes of a particular television show, the digital content provider may pre-load three episodes of the show onto the customer's computing device prior to departure. If network connectivity is adequate at the destination city, the digital content provider may schedule download of three additional episodes prior to the customer's departure from the destination city. However, if network connectivity is not adequate at the destination city, the digital content provider may schedule download of a greater amount of digital content prior to the customer's departure to the destination city.

In some embodiments, a digital content provider may receive a large volume of digital content from a variety of publishers. Some of the digital content received from these publishers may be immensely popular among the various customers of the digital content provider that, if made available to these customer for streaming would potentially cause a significant impact on the network bandwidth utilization for the digital content provider. To potentially avoid this issue, the digital content provider may identify digital content that may be exceedingly popular upon release and transmit encrypted copies of this digital content to a set of customers that may be interested in accessing this digital content when it is made available for use. Accordingly, FIG. 7 shows an illustrative example of a process 700 for scheduling download of digital content for a plurality of customers based at least in part on an estimation of the popularity of the digital content in accordance with at least one embodiment. The process 700 may be performed by the aforementioned digital content provider, which may be configured to analyze a variety of customer user profiles, activity logs, popular search queries based at least in part on the frequency of each search query and satisfied by particular digital content, and other external information, such as Nielsen ratings for popular television programs for which episodes are to be released as digital content or box office revenues for popular films to be released as digital content.

At any time, a digital content provider may receive a variety of digital content from one or more publishers of digital content. Some of this digital content may be restricted for use by customers of the digital content provider until a certain date, as established by the publisher or the digital content provider. For instance, particular digital content may be stored within the digital content repository of the digital content service but may not be accessed by a customer for use for a few days or weeks. Based at least in part on these restrictions for use, the digital content provider may determine 702 the upcoming releases of digital content for use by customers of the digital content service. An upcoming release may be defined by the digital content service as digital content whose restriction date is in one week or less, although the digital content service may utilize any time period as desired to define an upcoming release.

Once the digital content provider has determined its upcoming releases of digital content, the digital content provider may estimate 704 the popularity of each upcoming release. For instance, as noted above, the digital content provider may access a variety of customer user profiles to identify the popularity of various search queries (e.g., frequency of a particular search query over a period of time, total number of search queries for particular digital content, etc.), wish list contents, popular genres and ongoing series, and the like. Additionally, the digital content provider may obtain information from external sources to further identify potentially popular releases. For instance, the digital content provider may obtain information regarding box office revenues for any of the upcoming releases to identify releases that were popular when originally released in theaters. Alternatively, for television series and shows, the digital content provider may evaluate the Nielsen ratings for these upcoming releases to determine which releases were popular when originally aired on television.

Based at least in part on this information, the digital content provider may select 706 a popular subset of the upcoming releases of digital content. For instance, the digital content provider may identify the top ten releases that have the greatest potential popularity among customers of the digital content provider for pre-loading onto customer computing devices. Alternatively, the digital content provider may select a percentage of all upcoming releases that satisfy a particular estimated popularity threshold that may be provided to the customers of the digital content provider.

Once the digital content provider has selected the popular subset of the upcoming releases of digital content, the digital content provider may determine 708 a set of target customers for download of the popular upcoming releases of digital content. The digital content provider may again access the various customer user profiles to identify any customers that may have any of the popular upcoming releases included within a wish list and/or has conducted various search queries for any of these releases. Additionally, for upcoming releases of new episodes of a particular series or a sequel to an older film, the digital content provider may identify any customers that have faithfully watched various episodes of the particular series or has watched the older film a number of times. In some embodiments, customers may be permitted to purchase a season pass to digital content, such that these customers may be granted immediate access to upcoming releases when these releases are made accessible by the customer.

With the set of target customers identified for the popular upcoming releases of digital content, the digital content provider may subsequently schedule 710 downloads of these upcoming releases to each customer's computing device. As noted above, the digital content provider may review each customer's schedule, including any travel itineraries or other information that may be used to determine when the customer computing device will be available prior to release of the digital content. Additionally, the digital content provider may consider each customer's Internet Service Provider (ISP) to determine if the ISP is known for throttling network bandwidth for downloads of digital content. The digital content provider may determine whether a method is available to download the digital content bundled with other data to mask the nature of the digital content and thus prevent throttling of network bandwidth. However, if such methods cannot be discovered, the digital content service may take this into consideration when scheduling download of the digital content, as more time may be required. Based at least in part on each customer's schedule, the digital content provider may identify the best time periods when the digital content may be downloaded onto the customer's computing device.

Figure 8:
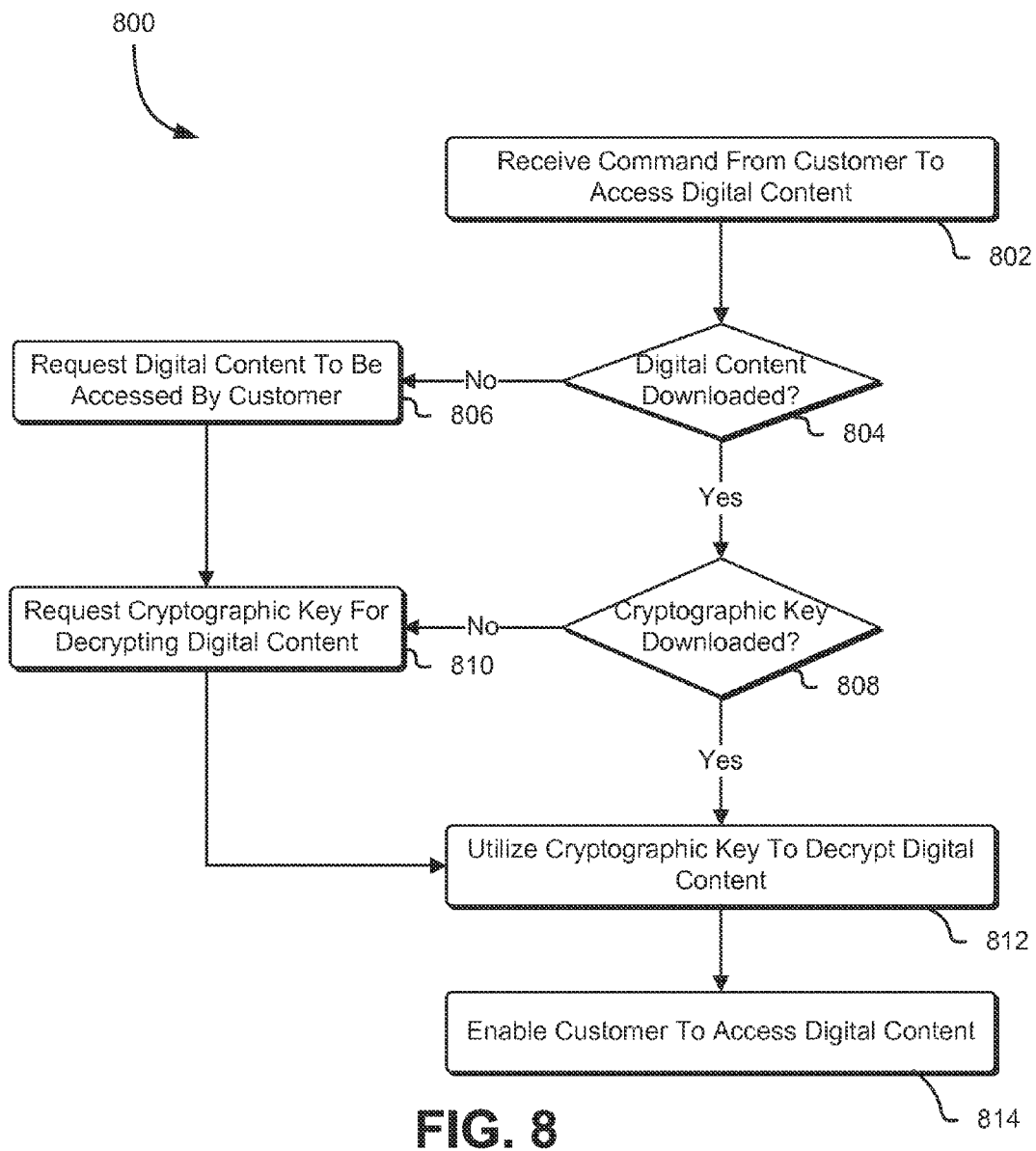
FIG. 8 shows an illustrative example of a process for enabling a customer to access digital content upon receipt of a command from the customer to access the digital content in accordance with at least one embodiment.

As noted above, a customer may utilize a digital content application installed on his/her computing device to access digital content stored within the one or more storage devices of the computing device or from the digital content provider. The digital content may be unavailable for at least one mode of consumption. For instance, the digital content may be available for purchase (e.g., pre-order, season pass subscriptions, etc.) through the digital content application but the digital content may not be accessible to the customer until a later date. In another instance, the digital content may be unavailable to the customer until he/she earns a certain number of reward points that may be used to redeem the digital content. In some embodiments, the digital content may be stored within the customer's computing device in an encrypted form, such that the digital content application may need to obtain one or more cryptographic keys from the digital content provider to decrypt the digital content and make it available for use. Accordingly, FIG. 8 shows an illustrative example of a process 800 for enabling a customer to access digital content upon receipt of a command from the customer to access the digital content in accordance with at least one embodiment. The process 800 may be performed by the digital content application, which may be installed on the customer's computing device and configured to provide customers with an interface for selecting digital content.

The digital content application installed on a customer's computing device may include an interface, which may enable customers of the digital content provider to identify any digital content that is available for purchase through the digital content provider. Additionally, the interface may enable customers to identify any digital content that may currently be unavailable for use but that is an upcoming release. The customer may be able to pre-order such digital content, which would be made available to the customer on or after the date of release. Through the interface, the customer may select digital content that he/she would like to access, either immediately or at a later time. For instance, in some embodiments, the customer may utilize the digital content application to pre-order digital content that is to be available for use on a predetermined later date. Alternatively, the customer may use the digital content application to purchase digital content that may otherwise be unavailable for consumption (e.g., no free access to the digital content). Thus, the digital content application, through the interface, may receive 802 a command from the customer to access the selected digital content.

The digital content application, subsequently, may access the customer's one or more storage devices to determine 804 whether the selected digital content has been downloaded onto these one or more storage devices. For instance, as noted above, the digital content provider may pre-load the customer's computing device with certain digital content based at least in part on the customer's viewing preferences, search query histories, the popularity (whether estimated or actual) of the digital content and other factors. Additionally, if the customer has a subscription through which certain digital content is to be provided to the customer at certain time intervals, the digital content provider may download this digital content onto the customer's computing device once the digital content becomes available for transfer. In some embodiments, the digital content downloaded onto the customer's computing device may be unavailable for at least one mode of consumption. For instance, while the digital content can be stored within the customer's computing device, the digital content may be encrypted and unavailable to the customer until he/she purchases the digital content, the date of availability for the digital content has been reached, the customer has utilized reward benefits to redeem the digital content and the like.

If the requested digital content has not been downloaded onto the customer's computing device, the digital content application may communicate with the digital content provider to request 806 that the digital content be downloaded onto the customer's computing device. For instance, if the customer has decided to purchase particular digital content from the digital content provider, the digital content application may transmit a request to the digital content provider to obtain the requested digital content and store the digital content within the customer's computing device. This digital content may be encrypted by the digital content provider to prevent unauthorized access of the digital content prior to a particular release date or attempts at piracy. Thus, once the digital content has been downloaded onto the customer's computing device, the digital content application may transmit 810 a request to the digital content provider to obtain one or more cryptographic keys for decrypting the digital content and making the digital content available for consumption. In some embodiments, if the digital content has been previously downloaded onto the customer's computing device, the digital content application may determine 808 whether the necessary one or more cryptographic keys have been downloaded. If the one or more cryptographic keys have not been downloaded for use, the digital content application may transmit 810 a request to the digital content provider to obtain these one or more cryptographic keys.

Once the digital content application has obtained the one or more cryptographic keys for the selected digital content, the digital content application may utilize 812 the one or more cryptographic keys to decrypt the digital content and enable 814 the customer to access the digital content. In some embodiments, the digital content application may wait until the actual release date of the selected digital content to decrypt the digital content. For instance, if the customer has pre-ordered the digital content through the digital content application, the digital content application may wait until it determines, either from a notification from the digital content provider or a date specified within an index file or metadata of the digital content, that the digital content can be accessed by the customer before utilizing the one or more cryptographic keys for decrypting the digital content.

Figure 9:
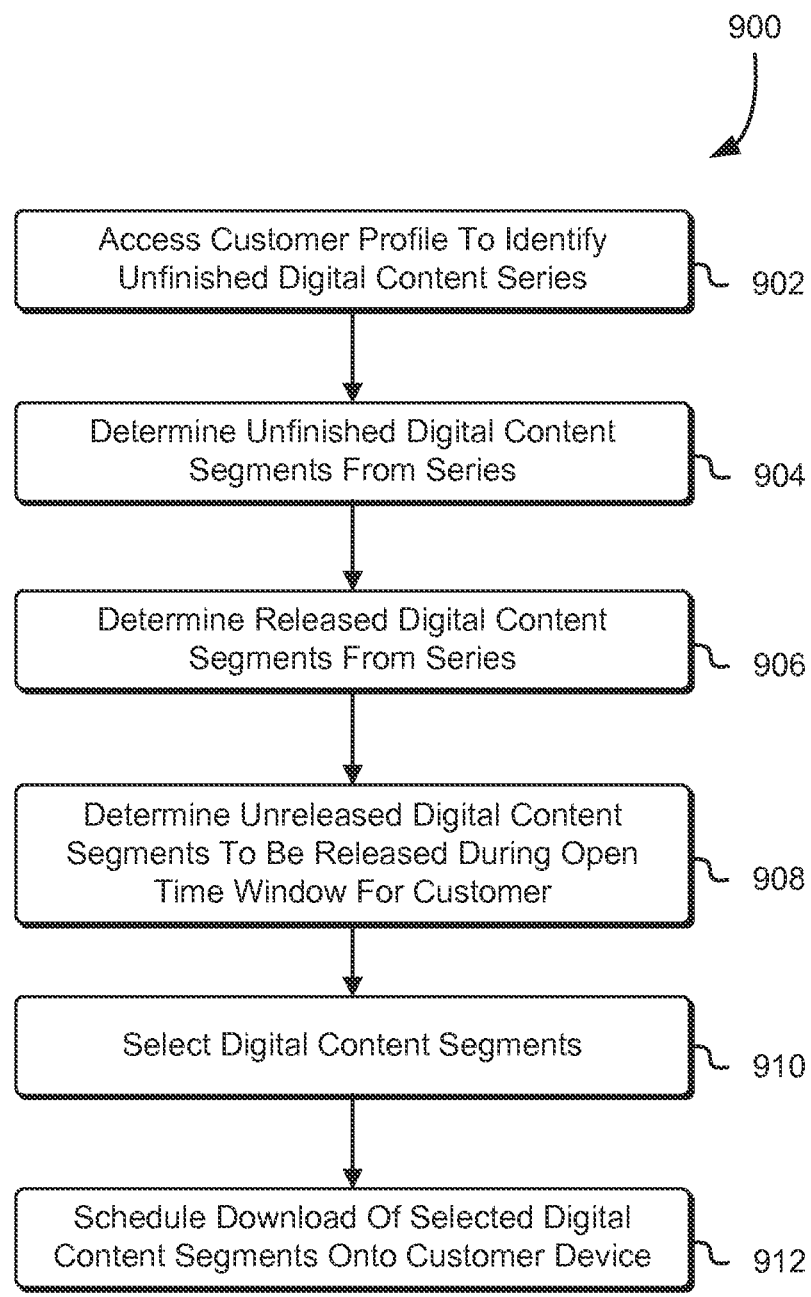
FIG. 9 shows an illustrative example of a process for selecting one or more digital content segments of a digital content series for download to a customer's computing device in accordance with at least one embodiment.

As noted above, the digital content provider may evaluate a customer's user profile to identify the customer's viewing/gaming preferences, trends (e.g., search queries, wish list items, etc.) and previous purchase history to select digital content that is to be downloaded onto his/her computing device for later use. For example, the digital content provider may identify one or more television series that the customer has viewed in the past to identify any episodes from these series that the customer may be interested in watching at a later time. These episodes may also be unavailable for at least one mode of consumption for the customer, as these episodes may be released at a later date (e.g., inaccessible by the customer although the digital content is available, etc.). Accordingly, FIG. 9 shows an illustrative example of a process 900 for selecting one or more digital content segments of a digital content series for download to a customer's computing device in accordance with at least one embodiment. The process 900 may be performed by the aforementioned digital content provider, which may be configured to evaluate a customer profile to identify any series the customer may be utilizing. Additionally, the digital content provider may be configured to transmit digital content to a customer's computing device as needed.

At any time, the digital content provider may access 902 a customer's user profile to identify any digital content series unconsumed in association with the user profile. For instance, the digital content provider may analyze the customer's viewing history across all of the customer's computing devices (e.g., desktop computers, laptop computers, mobile devices, smartphones, tablets, etc.) that may include a digital content application for using digital content from the digital content provider. The digital content application on all devices may update the customer's user profile upon viewing of an episode of a particular series. Thus, the digital content service may analyze the customer's viewing history to determine whether a customer has faithfully watched episodes of a particular television or film series. However, the customer may not have finished watching all episodes of the particular series, including upcoming episodes that may be released in the short term (e.g., within a week, etc.). Based at least in part on these unfinished digital content series, the digital content provider may determine 904 the unconsumed digital content segments (e.g., episodes) from the unfinished series identified through the customer's user profile.

Once the digital content provider has determined which unfinished digital content segments exist from the particular series, the digital content provider may determine 906 which of these unfinished segments have been released by the publisher of the digital content series. For instance, this may include various episodes from the series that the publisher has provided to the digital content provider for immediate release to customers of the digital content provider upon request. Additionally, or alternatively, the released digital content segments may include published digital content that, while unavailable for at least one mode of consumption until a given date (e.g., pre-order content, etc.), may be available for download onto the customer's computing device immediately in an encrypted format to prevent unauthorized access by the customer or other users.

The digital content service may additionally determine 908 what unreleased digital content segments are to be released during an open time window for the customer's computing device. As noted above, the digital content provider may review a customer's schedule to determine when his/her computing device will be available for downloading digital content. Based at least in part on this schedule, the digital content provider may identify one or more open time windows for downloading digital content onto the customer's computing device. The digital content provider may identify one or more dates when digital content segments are going to be published to the digital content provider for download. These digital content segments may also be encrypted to prevent unauthorized access or tampering by the customer or other user prior to the actual date when the digital content is to be available for use.

Once the digital content provider has identified the digital content segments that have been released or will be released during the customer's one or more open time windows, the digital content provider may select 910 one or more of these digital content segments that are to be downloaded onto the customer's computing device. The selection may be based at least in part on the available storage capacity within the customer's computing device and any proxy computing device the customer may utilize to access the digital content. Additionally, or alternatively, the digital content provider may select the digital content segments based at least in part on the customer's own schedule and viewing habits. For instance, if the customer will be travelling, and the trip takes approximately three hours, the digital content provider may select digital content segments that may be viewed within these three hours while the customer's computing device is offline. Based at least in part on the selected digital content segments and the customer's own schedule, the digital content provider may schedule 912 downloading of the selected digital content segments onto the customer's computing device.

Figure 10:
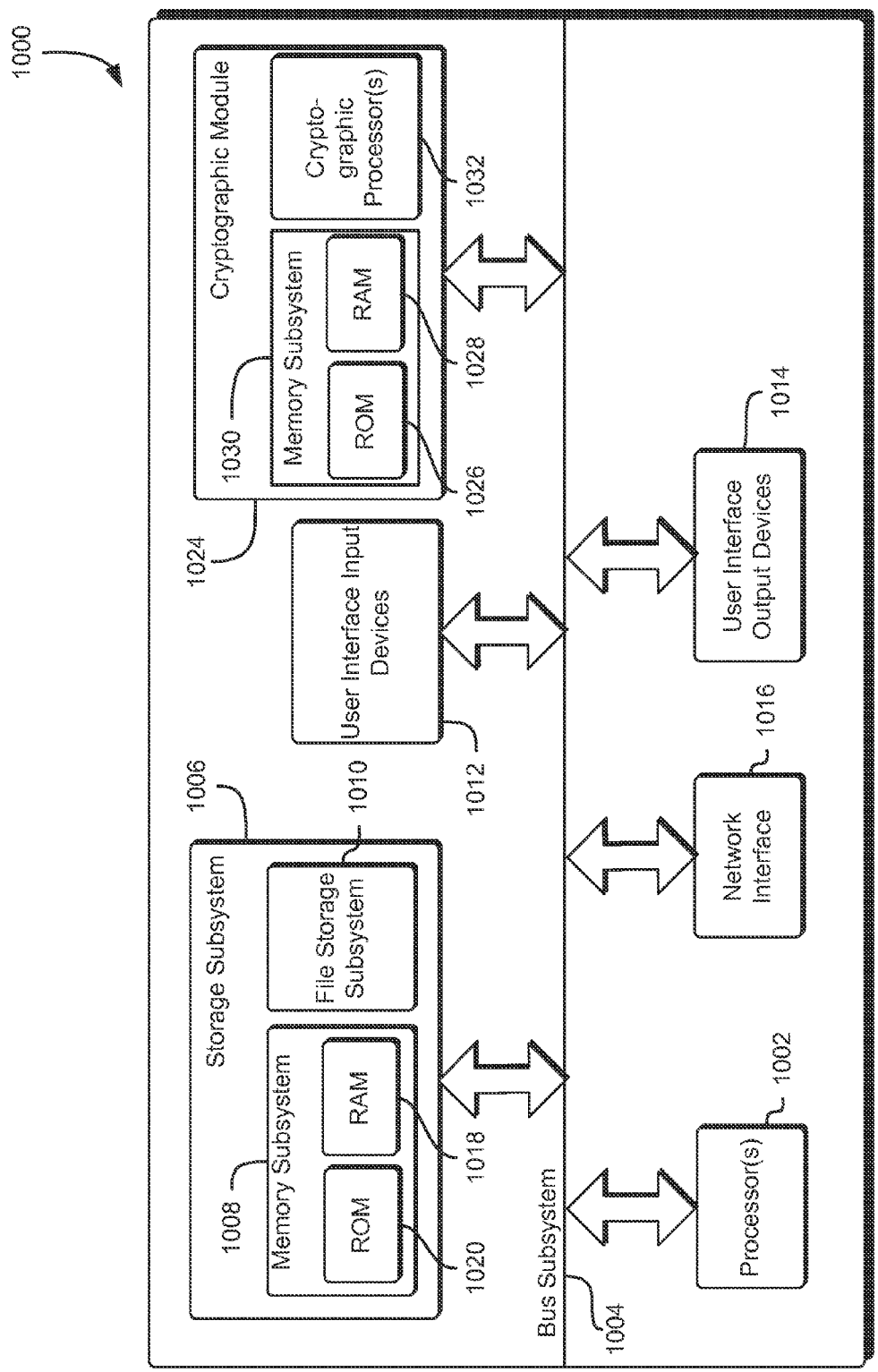
FIG. 10 shows an illustrative example of a customer computing device that may be used to access digital content in accordance with at least one embodiment.

FIG. 10 shows an illustrative example of a customer computing device 1000 that may be used to access digital content in accordance with at least one embodiment. In various embodiments, the customer computing device 1000 may be used to implement any of the systems illustrated herein and described above. For example, the customer computing device 1000 may be used to receive customer requests for digital content, submit any requests to a digital content provider, receive digital content and cryptographic keys from the digital content provider, display digital content, communicate with other proxy computing devices to access stored digital content, and/or perform other activities. As shown in FIG. 10, the customer computing device 1000 may include one or more processors 1002 that may be configured to communicate with and are operatively coupled to a number of peripheral subsystems via a bus subsystem 1004. These peripheral subsystems may include a storage subsystem 1006, comprising a memory subsystem 1008 and a file storage subsystem 1010, one or more user interface input devices 1012, one or more user interface output devices 1014, a network interface subsystem 1016, a cryptographic module 824, comprising a memory subsystem 830 and one or more cryptographic processors 832.

The bus subsystem 1004 may provide a mechanism for enabling the various components and subsystems of customer computing device 1000 to communicate with each other as intended. Although the bus subsystem 1004 is shown schematically as a single bus, alternative embodiments of the bus subsystem may utilize multiple busses.

The network interface subsystem 1016 may provide an interface to other device systems and networks. The network interface subsystem 1016 may serve as an interface for receiving data from and transmitting data to other systems from the customer computing device 1000. For example, the network interface subsystem 1016 may enable a customer to connect the customer computing device 1000 to a wireless network such that the customer may be able to transmit and receive data while in a remote location. For example, the customer may utilize the customer computing device 1000 to transmit a request for certain digital content to a digital content provider through a wireless access point. Additionally, the customer may use the device 1000 to receive transmissions from the digital content provider through a similar wireless access point. The network interface subsystem 1016 may also facilitate the receipt and/or transmission of data on other networks, such as a customer network.

The user interface input devices 1012 may include one or buttons, a keyboard, pointing devices such as an integrated mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to the device 1000.

User interface output devices 1014 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the device 1000. The output device(s) 1014 may be used, for example, to present user interfaces to facilitate user interaction with applications performing processes descried herein and variations therein, when such interaction may be appropriate.

The storage subsystem 1006 may provide a computer-readable storage medium for storing the basic programming and data constructs that may provide the functionality of at least one embodiment of the present disclosure. The applications (programs, code modules, instructions) that, when executed by one or more processors, may provide the functionality of one or more embodiments of the present disclosure, may be stored in the storage subsystem 1006. These application modules or instructions may be executed by the one or more processors 1002. The storage subsystem 1006 may additionally provide a repository for storing data used in accordance with the present disclosure. The storage subsystem 1006 may comprise a memory subsystem 1008 and a file/disk storage subsystem 1010.

The memory subsystem 1008 may include a number of memories including a main random access memory (RAM) 1018 for storage of instructions and data during program execution and a read only memory (ROM) 1020 in which fixed instructions may be stored. The file storage subsystem 1010 may provide a non-transitory persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

The device 1000 may include one or more batteries 1022. The batteries 1022 may be used to provide a power supply for the device 1000 and all of the subsystems included therein. The batteries 1022 may be comprised of one or more electrochemical cells which may convert chemical energy into electrical energy. The batteries 1022 may be disposable (e.g., alkaline batteries) or rechargeable (e.g., lithium-ion, nickel-cadmium, nickel-metal hydride, or any other suitable chemical composition that may enable reusability of the battery) and may fit integrally into the device.

The cryptographic module 1024, which may be a trusted platform module (TPM), includes a memory subsystem 1030, including a main random access memory (RAM) 1028 for storage of instructions and data during program execution and a read only memory (ROM) 1026, in which fixed cryptographic information may be stored, such as a hardware secret stored securely within the device 1000 so as to be non-exportable (i.e., inaccessible through any call to the cryptographic module 1024). The cryptographic module 1024, in some embodiments, operates wholly or partly in compliance with Trusted Computing Group's TPM Main Specification level 2, Version 1.2, Revision 116, TPM Main Specification level 2, Version 1.2, Revision 103 and/or ISO/IEC 11889, which are incorporated herein by reference. The device 1000 may also store cryptographic keys in RAM 1028 and/or processor registers for temporary cryptographic processing. The cryptographic information stored in memory may be used in combination with cryptographic information obtained via the network interface 1016 and/or one or more of the user interface input devices 1012. The one or more cryptographic processors may be used to perform cryptographic operations in the device and may include a random number generator, SHA-2 or other hash generator and an encryption-decryption-signature engine.

The one or more cryptographic processors may also be configured to perform one or more encryption/decryption algorithms in accordance with one or more cryptographic algorithms, such as public key and/or private key cryptographic algorithms. Symmetric key algorithms may include various schemes for performing cryptographic operations on data including block ciphers, stream ciphers and digital signature schemes. Example symmetric key algorithms include, but are not limited to, the advanced encryption standard (AES), the data encryption standard (DES), triple DES (3DES), Serpent, Twofish, blowfish, CAST5, RC4 and the international data encryption algorithm (IDEA). Symmetric key algorithms may also include those used to generate output of one-way functions and include, but are not limited to, algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include, but are not limited to, those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure. Generally, one or more components of the cryptographic module 1024 may be configured to collectively perform various operations used for generating cryptographically verifiable information for security tasks.

As noted above, the device 1000 may receive one or more licenses and cryptographic keys from the digital content provider. These licenses and cryptographic keys may be securely stored within the cryptographic module 1024. In some embodiments, if a user modifies the device 1000 system clock in order to attempt early access to the encrypted digital content, the cryptographic module 1024 may adjust the availability time for the one or more cryptographic keys according to the modifications made to the system clock. This may help ensure that the encrypted digital content may only be accessed at a time specified by the digital content provider.

The device 1000 may be of various types including a portable computer device, tablet computer, a workstation, or any other data processing system that may provide portability for a customer or other user of the device 1000. Additionally, the device system 1000 may include another device that may be connected to the device 1000 through one or more ports (e.g., USB, a headphone jack, Lightning connector, etc.). The device that may be connected to the device 1000 may include a plurality of ports configured to accept fiber-optic connectors. Accordingly, this device may be configured to convert optical signals to electrical signals that may be transmitted through the port connecting the device to the device 1000 for processing. Due to the ever-changing nature of computers and networks, the description of the device 1000 depicted in FIG. 10 is intended only as a specific example for purposes of illustrating the preferred embodiment of the device. Many other configurations having more or fewer components than the system depicted in FIG. 10 are possible.

Figure 11:
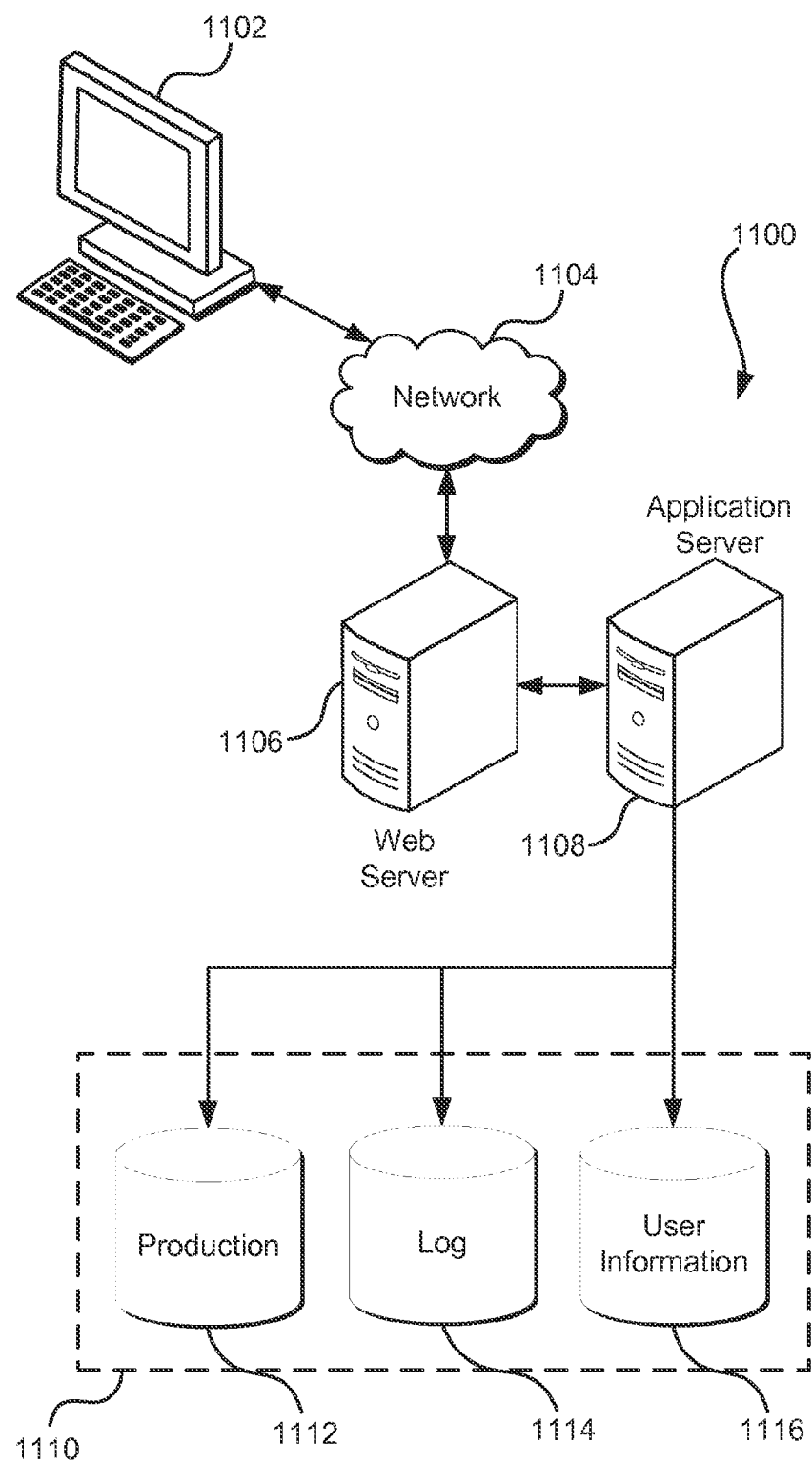
FIG. 11 shows an illustrative example of an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment.

The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1102 and the application server 1108, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. The application server 1108 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   determining, based at least in part on a user profile specifying a customer's digital content preferences, an economic measure associated with the digital content, and popularity of search queries by a plurality of customers satisfied by the digital content, digital content to be pre-loaded on a customer computing device, the digital content unavailable for at least one mode of consumption;
   in advance of the at least one mode of consumption becoming available to the customer, downloading at least a portion of an encrypted copy of the digital content onto the customer computing device;
   receiving, at a time after downloading the at least the portion of the encrypted copy of the digital content onto the customer computing device, from the customer computing device, a request to obtain one or more cryptographic keys usable to decrypt the encrypted digital content; and
   as a result of the at least one mode of consumption becoming available to the customer, providing the one or more cryptographic keys to the customer computing device to enable the customer computing device to decrypt the downloaded at least the portion of the encrypted copy of the digital content.

2. The computer-implemented method of claim 1, wherein the digital content to be pre-loaded on the customer computing device includes one or more digital content segments of a digital content series unconsumed in association with the user profile.

3. The computer-implemented method of claim 1, wherein the method further comprises:
   determining, based at least in part on the user profile, one or more times when the customer computing device is not available; and
   scheduling, in advance of the one or more times when the customer computing device is not available, downloading of the at least the portion of the encrypted copy of the digital content onto the customer computing device such that the at least the portion of the encrypted copy of the digital content is downloaded prior to the one or more times when the customer computing device is not available.

4. The computer-implemented method of claim 1, wherein the at least the portion of the encrypted copy of the digital content is downloaded onto the customer computing device as a result of the customer computing device being subscribed to a broadcast channel through which the encrypted copy of the digital content is transmitted.

5. A system, comprising at least one computing device configured to implement one or more services, wherein the one or more services:
   identify digital content to be downloaded on a customer computing device, based at least in part on a user profile for a customer, and popularity of search queries by a plurality of customers satisfied by the digital content, the digital content unavailable for at least one mode of consumption;
   in advance of the at least one mode of consumption becoming available to the customer, download at least a portion of the digital content onto the customer computing device such that the customer computing device is unable to provide the digital content for consumption; and
   as a result of the at least one mode of consumption becoming available to the customer, enable use of the downloaded at least the portion of the digital content through the customer computing device.

6. The system of claim 5, wherein the one or more services are further configured to transmit, at a time after downloading the at least the portion of the digital content onto the customer computing device, one or more cryptographic keys to the customer computing device to enable decoding of the digital content and use of the downloaded at least the portion of the digital content.

7. The system of claim 5, wherein the one or more services are further configured to:
   in advance of the at least one mode of consumption becoming available to the customer and as a result of the customer computing device lacking storage capacity for at least a second portion of the digital content, download the at least the second portion of the digital content onto a proxy customer computing device;
   notify the customer computing device that the second portion of the digital content is stored within the proxy customer computing device; and
   as a result of the at least one mode of consumption becoming available to the customer, enable the customer computing device to access the proxy customer computing device to obtain the second portion of the digital content for use of the second portion of the digital content through the customer computing device.

8. The system of claim 5, wherein the one or more services are further configured to:
   identify, based at least in part on one or more travel itineraries specified within the user profile, one or more times when the customer computing device is not available; and
   schedule, in advance of the one or more times when the customer computing device is not available, downloading of the at least the portion of the digital content onto the customer computing device.

9. The system of claim 5, wherein the one or more services are further configured to, as a result of the downloaded at least the portion of the digital content being used through the customer computing device, stream a second portion of the digital content through the customer computing device.

10. The system of claim 5, wherein the digital content to be downloaded onto the customer computing device includes one or more episodes of a digital content series unconsumed in association with the user profile.

11. The system of claim 5, wherein the digital content to be downloaded onto the customer computing device includes pre-ordered digital content previously unreleased by a publisher of the digital content and unconsumed in association with the user profile.

12. A non-transitory computer-readable storage medium having stored thereon executable instructions that, if executed by one or more processors of a computer system, cause the computer system to at least:
   select, based at least in part on user profiles for a plurality of customers specifying a customer's digital content preferences and an economic measure associated with the digital content including sales revenue associated with the digital content, and for particular digital content, a subset of the plurality of customers for which the digital content is to be downloaded onto customer computing devices of the subset of the plurality of customers, the digital content unavailable for at least one mode of consumption;
   in advance of the at least one mode of consumption becoming available to the customer, download at least a portion of the digital content onto the customer computing devices of the subset of the plurality of customers such that the customer computing devices are unable to provide the digital content for consumption; and as a result of the at least one mode of consumption becoming available to the subset, enable use of the downloaded at least the portion of the digital content through the customer computing devices of the subset.

13. The non-transitory computer-readable storage medium of claim 12, wherein the digital content to be downloaded onto the customer computing device includes one or more downloadable content segments of a digital content series unconsumed in association with the user profile.

14. The non-transitory computer-readable storage medium of claim 12, wherein the instructions further comprise instructions that, when executed by the one or more processors, cause the computer system to, for at least one customer of the subset of the plurality of customers:

identify, based at least in part on a schedule specified within the customer's user, one or more times when one or more customer computing devices of the customer are not available; and schedule, in advance of the one or more times when the one or more customer computing devices are not available, downloading of the at least the portion of the digital content onto at least one of the one or more customer computing devices.

15. The non-transitory computer-readable storage medium of claim 12, wherein the instructions further comprise instructions that, when executed by the one or more processors, cause the computer system to transmit, at a time after downloading the at least the portion of the digital content onto the customer computing devices of the subset, one or more cryptographic keys to the customer computing devices of the subset to enable decoding of the digital content.

16. The non-transitory computer-readable storage medium of claim 12, wherein the digital content to be downloaded onto the customer computing devices of the subset includes pre-ordered digital content previously unreleased to the plurality of customers and unconsumed in association with the user profiles of at least one customer of the subset.

17. The non-transitory computer-readable storage medium of claim 12, wherein the at least the portion of the digital content is downloaded onto the customer computing devices of the subset as a result of the customer computing devices of the subset configured to receive the digital content through a multicast channel through which the digital content is transmitted.

18. The non-transitory computer-readable storage medium of claim 12, wherein:

user profiles of the plurality of customers have time-segmented information; and the instructions that cause the computer system to select the subset of the plurality of customers, when executed by the one or more processors, cause the computer system to select the subset based at least in part on the time-segmented information.

19. The non-transitory computer-readable storage medium of claim 12, wherein the instructions further comprise instructions that, when executed by the one or more processors, cause the computer system to, for at least one customer of the subset of the plurality of customers:

in advance of the at least one mode of consumption becoming available to the customer, determine whether a first customer computing device of the customer lacks storage capacity for storing the at least the portion of the digital content;

select a second customer computing device of the customer based at least in part on available storage capacity of the second customer computing device;

download the at least the portion of the digital content onto the second customer computing device;

notify the first customer computing device that the at least the portion of the digital content is stored within the second customer computing device; and as a result of the at least one mode of consumption becoming available to the customer, enable the first customer computing device to access the second customer computing device to obtain the at least the portion of the digital content for use of the at least the portion of the digital content through the first customer computing device.

20. The non-transitory computer-readable storage medium of claim 12, wherein the measure associated with the digital content comprises:

an economic measure associated with the digital content;
a popularity rating for the digital content;
a popularity of search queries by a plurality of customers satisfied by the digital content; or
wish list entries for the plurality of customers specifying the digital content.

* * * * *